US010878357B1

(12) United States Patent
Rosenman et al.

(10) Patent No.: US 10,878,357 B1
(45) Date of Patent: Dec. 29, 2020

(54) NATURAL EXPERIMENT FINDER SYSTEM AND METHOD

(75) Inventors: Evan Rosenman, Warren, NJ (US); Aaron Silverman, Washington, DC (US); Vrushali Paunikar, San Francisco, CA (US); Alan Li, Ashburn, VA (US); Mark D'Agostino, Washington, DC (US); Andrew Crewson, Arlington, VA (US); Michael Monteiro, Menlo Park, CA (US); Scott Ings, Arlington, VA (US)

(73) Assignee: Applied Predictive Technologies, Inc., Arlington, VA (US)

( * ) Notice: Subject to any disclaimer, the term of this patent is extended or adjusted under 35 U.S.C. 154(b) by 1563 days.

(21) Appl. No.: 13/337,498

(22) Filed: Dec. 27, 2011

(51) Int. Cl.
 *G06Q 10/06* (2012.01)
 *G06Q 30/02* (2012.01)
 *G06N 5/00* (2006.01)

(52) U.S. Cl.
 CPC ....... *G06Q 10/0637* (2013.01); *G06Q 10/067* (2013.01); *G06Q 30/0202* (2013.01); *G06N 5/003* (2013.01)

(58) Field of Classification Search
 CPC .... G06Q 10/00; G06Q 30/02; G06Q 10/0637; G06Q 10/067; G06Q 30/0202; G06N 5/003
 USPC .............................................. 705/7.11–7.42
 See application file for complete search history.

(56) References Cited

U.S. PATENT DOCUMENTS

| | | | | |
|---|---|---|---|---|
| 7,292,960 | B1* | 11/2007 | Srinivasa | G06Q 50/22 340/500 |
| 7,512,623 | B2* | 3/2009 | Apps et al. | |
| 7,590,658 | B2* | 9/2009 | Bahl | G06F 17/30592 |
| 7,953,619 | B2* | 5/2011 | Heredia | G06Q 10/06 705/7.38 |
| 8,209,218 | B1* | 6/2012 | Basu | G06Q 10/0637 705/7.36 |
| 8,224,686 | B1* | 7/2012 | Bruce et al. | 705/7.29 |
| 8,571,916 | B1* | 10/2013 | Bruce et al. | 705/7.28 |
| 8,583,695 | B2* | 11/2013 | Espejel et al. | 707/798 |
| 2003/0200192 | A1* | 10/2003 | Bell | G06F 17/3087 |

(Continued)

OTHER PUBLICATIONS

Goswami et al., Controlled Experiments for Decision-Making in e-Commerce Search, IEEE International Conference on Big Data, pp. 1095-1102 (Year: 2015).*

(Continued)

*Primary Examiner* — Robert D Rines
(74) *Attorney, Agent, or Firm* — Foley & Lardner LLP

(57) ABSTRACT

The methods and systems described herein attempt to address the above-mentioned need by providing an algorithm and software capability to automatically detect and assess "natural experiments" that exist in any underlying dataset. In one embodiment, a computer-implemented method for identifying an experiment to use in an analysis of a business initiative comprises storing, by a computer, a set of historical data regarding entities in a business network; receiving, by the computer, a selection of inputs for the historical data; detecting, by the computer, a natural experiment based upon changes in the discretized historical data; and outputting, by the computer, a report of a detected experiment from the discretized historical data.

26 Claims, 16 Drawing Sheets

(56) References Cited

U.S. PATENT DOCUMENTS

2006/0190318 A1* 8/2006 Downey ........... G06F 17/30539
705/7.33

OTHER PUBLICATIONS

Ayres, Chapter 2: Creating Your Own Data with the Flip of a Coin, Super Crunchers: Why Thinking-by-Numbers is the New Way to Be Smart, 2007, Bantam, New York, p. 46-63.
Anderson et al., A Step-by-Step Guide to Smart Business Experiments, Harvard Business Review, Mar. 2011, downloaded from http://hbr.org/2011/03/a-step-by-step-guide-to-smart-business-experiments/ar/1 on Dec. 8, 2011, 7 pages.
Brody, Sorting Through the Confusion Over Estrogen, The New York Times, 2002, downloaded from http://www.nytimes.com/2002/09/03/science/sorting-through-the-confusion-over-estrogen.html?pagewanted=all on Dec. 8, 2011, 5 pages.
Davenport, How to Design Smart Business Experiments, Harvard Business Review, Feb. 2009, downloaded from http://hbr.org/2009/02/how-to-design-smart-business-experiments/ar/1 on Dec. 8, 2011, 8 pages.
Marketing Mix Modeling, Wikipedia, downloaded from http://en.wikipedia.org/wiki/Marketing_mix_modeling on Dec. 8, 2011, 8 pages.
McCann, Big Retailers Put Testing to the Test, News and Insight for Financial Executives, CFO, 2010, downloaded from http://www.cfo.com/article.cfm/14538026?f=singlepage on Dec. 8, 2011, 2 pages.
Natural Experiment, Wikipedia, the Free Encyclopedia, downloaded from http://en.wikipedia.org/wiki/Natural_experiment on Dec. 8, 2011, 3 pages.
Pearlstein, In Studying Behavior, Scientific Testing Has Advantages—and Limits, The Washington Post: National, World & D.C. Area News and Headlines, 2010, downloaded from http://www.washingtonpost.com/wp-dyn/content/article/2010/08/03/AR2010080306820.html on Dec. 8, 2011, 3 pages.
Rosenzweig et al., Natural "Natural Experiments" in Economics, Journal of Economic Literature, 2000, pp. 827-874, vol. XXXVIII.
Ryan, How to Know What Media are Working, IMedia Connection, 2006, downloaded from http://www.imediaconnection.com/content/11502.asp on Dec. 8, 2011.
Stedman, 'Natural Experiment' Documents the Population Benefit of Vaccinating Preschoolers against the Flu, EurekAlert!, Sep. 2011, downloaded from http://www.eurekalert.org/pub_releases/2011-09/chb-ed091511.php on Dec. 8, 2011, 2 pages.
The Future of Advertising: Implications for Marketing and Media, Booz | Allen | Hamilton, 2006, downloaded from http://www.boozallen.com/media/file/153550.pdf on Dec. 8, 2011, 9 pages.

* cited by examiner

|         | 1/1/2011 | 1/2/2011 | 1/3/2011 | 1/4/2011 | 1/5/2011 |
|---------|----------|----------|----------|----------|----------|
| Store 1 | $7.50    | $7.50    | $8.50    | $8.50    | $8.50    |
| Store 2 | $7.50    | $7.50    | $8.50    | $8.50    | $7.50    |
| Store 3 | $6.50    | $7.50    | $8.50    | $7.50    | $7.50    |
| Store 4 | $7.50    | $7.50    | $7.50    | $7.50    | $7.50    |
| Store 5 | $7.50    | $7.50    | $7.50    | $7.50    | $6.50    |
| Store 6 | $6.50    | $7.50    | $7.50    | $6.50    | $6.50    |

*FIG. 10*

| | 1/1/2011 | 1/2/2011 | 1/3/2011 | 1/4/2011 | 1/5/2011 |
|---|---|---|---|---|---|
| Store 1 | $7.50 | $7.50 | $8.50 | $8.50 | $8.50 |
| Store 2 | $7.50 | $7.50 | $8.50 | $8.50 | $7.50 |
| Store 3 | $6.50 | $7.50 | $8.50 | $7.50 | $7.50 |
| Store 4 | $7.50 | $7.50 | | | |
| Store 5 | $7.50 | $7.50 | | | |
| Store 6 | $6.50 | $7.50 | | | |

On 1/4/2011, Store 1 saw a change in competitor price, so 1/4 and 1/5 are no longer included in the experiment.

NATURAL EXPERIMENT FINDER SYSTEM AND METHOD

FIELD OF THE INVENTION

The present teaching relates to methods, systems, and programming for evaluating business initiatives using natural experiments.

BACKGROUND

For centuries, scientists have relied on the scientific method to prove or disprove hypotheses about causality in our world. In order to show that an action (A) will cause an outcome (B), scientists typically execute a controlled experiment where the action (A) is performed on one population (a test group), and compare the outcome to a similar population where the action was not performed (a control group). Any consistent and repeatable difference in outcome (B) is then considered to be caused by the action (A).

In recent years, this approach has been adopted by retailers, banks, manufacturers, restaurants, hotels, schools, and insurers, among others, to assess the incremental impact of any business initiative on customer behavior and, hence, key performance metrics (such as customer count, revenue, and profit). These companies apply the scientific method by executing a designed test of the initiative in a subset of their locations and comparing their performance to locations that did not receive the initiative. Because the initiative was actually tried in a subset of stores, and their performance was compared to stores that did not receive the initiative, the business can have a confident perspective on "what will happen" if they execute the initiative going forward.

Examples of these business initiatives include: changing prices, moving products to different areas of the store, introducing new products, adding or reducing sales staff, remodeling older stores, and running television ads. Knowing how these initiatives will contribute to the business's profitability before committing to a major network-wide investment allows them to more accurately predict which ideas will work and which will waste valuable capital.

However, actively designing and executing a test can be a costly and time-intensive exercise. At the same time, for initiatives such as price changes, advertising, and changes in sales staff (as well as uncontrollable events such as weather and economic conditions), store-by-store variations already occur on a daily basis. For example, a district manager may decide to reduce price on a key product in his 20 stores, or a store manager may decide to take on an additional employee to help out during the lunchtime rush. Regardless of the intention, these small variations can be thought of miniature tests, or "natural experiments," and can provide much the same insight as a designed test.

Automatically detecting such experiments can be hugely valuable to a business. First, they can be used as a substitute for actively designed tests. Executing a designed test takes significant resources between to determine the action to take, address operational complexities, coordinate its implementation, wait for it to be in market long enough, and measure the action for its effectiveness. This feedback delay lengthens the time before any resultant profit-generating action can be taken, reducing its return on investment and constraining the number of tests that are feasible to run. Second, these natural experiments can provide insights on-demand that lead directly to massively profitable changed decisions. For example, figuring out whether a bottle of soda should be priced at $0.89, $0.99, or $1.09, given that it costs the retailer $0.50, can swing profits by as much as 50%, depending on consumer response to each price point.

Because these variations occur as a natural course of business and are not centrally coordinated or explicitly tracked (in contrast to a central list of stores to be remodeled), it can be very challenging to discover these examples in order to use them to assess the impact of the changes. However, because these companies are already tracking metrics such as labor hours, price charged, and advertising levels by store and by day, there exists an opportunity to automatically mine these datasets to detect instances where part of the network changed and part of the network did not, which may be considered "natural experiments."

There are basically two existing alternatives to assessing the incremental impact of historic changes: (1) econometric modeling/time series regression, and (2) manually finding natural experiments. Econometric modeling uses each individual store/day combination as one observation of both the "independent variable" (e.g., price) and the "dependent variable" (e.g., units sold), and performs a basic statistical regression between the two. Econometric modeling uses a standard statistical technique, tests whether a significant relationship exists, and if so, quantifies the size of change in units that is commonly associated with each $1 change in price. This conventional approach is commonly used, particularly in the advertising industry, to assess the historic incremental impact of different actions. Almost all major advertisers employ media mix modeling using consultancies that apply multivariate regression modeling techniques to (1) establish the portion of historic sales that were due to advertising, and (2) forecast what incremental sales will be generated by future advertising plans. For example, a store may desire to predict how a new promotion will impact their sales. So they would build a regression model to predict sales within a time period. The model would consider all factors as variables (e.g., how much inventory was available, the use of media advertisements, the weather) and the coefficient for each variable would correlate its impact.

Econometric modeling has some shortcomings. Fundamentally, this type of modeling tests for correlation, not causation. As an example, imagine the business question being whether an increase in inventory (units on hand to be sold) of a particular product will drive an increase in sales. At the same time, assume that stores with strong sales of that product have already adjusted their inventory upward to accommodate demand. Regression analysis will identify that inventory is highly correlated with sales and an econometric approach may therefore assume that future increases in inventory will cause more sales. But in this case, it is more likely that it is the higher expectation for sales that drives the higher inventory and not the higher inventory is driving the higher sales. So drawing conclusions from correlational studies can be inaccurate, and a more rigorous test versus control approach to high stakes business decisions is needed. Finding test versus control opportunities to establish causation between a business's specific actions and resultant changes in profitability is generally recognized as a superior approach. This, for example, is why the Food and Drug Administration asks for test versus control (also known as placebo) tests to validate drug effectiveness and safety instead of relying on cross-sectional studies and regression modeling. However, it may be challenging to find or create such examples in a business environment.

A user can manually attempt to find natural experiments in the same datasets, but the user must look through each week of data for a group of stores that changed and a group of stores that did not. This method has some shortcomings, as it is highly time-intensive, complex, and error-prone. As a result, it can be very challenging to find the best subset of "test" stores that balances consistency and length of the experiment with similarity to the "control" group.

What is desired is a system to automatically scan historic datasets (e.g., price by store over time) to: (a) detect the dates on which pockets of stores change in a consistent manner while other stores do not; (b) determine the best subset of test and control stores to be used, balancing store count (in both test and control), internal consistency of the change (in test), similarity (between test and control), and length of the change; (c) compile a list of all the experiments found, and present a rank ordered list with the "best" natural experiments at the top; and (d) allow the user to select which experiments to be analyzed (measurement of the change's impact on key performance metrics).

SUMMARY

The conventional scientific method of using test versus control analysis is often considered the accepted best practice for establishing causality. In the business world, many companies apply this concept to determine which actions they could take will generate the most profit improvement. However, it can be challenging, costly, and time-intensive to dimension, execute, and measure a planned test versus control experiment.

"Natural experiments" or naturally occurring pockets of differential treatment in subsets of a business' network can provide much the same insights as designed tests, but can be difficult to identify. It is desirable to have an algorithm that can scan historic datasets of treatment across a network to identify natural experiments for test vs. control analysis would be hugely valuable for these businesses.

The methods and systems described herein attempt to address the above-mentioned need by providing an algorithm and software capability to automatically detect and assess "natural experiments" that exist in any underlying dataset.

In one embodiment, a computer-implemented method for identifying an experiment to use in an analysis of a business initiative comprises storing, by a computer, a set of historical data regarding entities in a business network; receiving, by the computer, a selection of inputs for the historical data; detecting, by the computer, a natural experiment based upon changes in the historical data; and outputting, by the computer, a report of a detected experiment from the historical data.

In another embodiment, a computer-implemented method for identifying an experiment to use in an analysis of a business initiative comprises storing, by a computer, a set of historical data regarding entities in a business network, wherein the historical data includes values of attributes that relate to the business initiative; receiving, by the computer, a selection of inputs for the historical data, wherein the selection of inputs includes a timeframe and at least one measurable attribute; selecting, by the computer, only the values of the inputs from the set of historical data; discretizing, by the computer, the selected input values from the historical data into a plurality of ranges; detecting, by the computer, at least one experiment based upon a plot of the selected input versus the timeframe using the discretized historical data; and outputting, by the computer, a report regarding at least one detected experiment.

A first input can limit the historical data to a time period. A second input can be selected from the group consisting of a price of a product or service, labor hours, media expenditures, geographic media use, a weather metric, a geographic limitation, a minimum experiment size, an entity list, a minimum number of test entities, a minimum number of control entities, a difference between the minimum number of test entities and a minimum number of control entities, a minimum experiment pre-period length, a minimum post-period length, an external market factor, a delay time period, and a number of time periods to aggregate. The historical data can be normalized to compare values of different magnitudes. The historical data can be manipulated by assigning a weight to an input for each product or service in a category. The weight of each input can vary based upon a change in the weight over a time period. The values of an input for the historical data can be discretized into a plurality of ranges. Discretizing can include generating ranges based upon a percentage of a standard deviation or an absolute amount. Discretization can include receiving, from a user, a defined range for use in discretization. Discretization can include automatically determining the plurality of ranges. A first type of natural experiment can be detected where an input for a test group and an input for a control group start at the same value; and at a certain time, the control group input remains at the same value and the test group input changes in value. A second type of natural experiment can be detected where an input for a test group and an input for a control group start at the same value; and at a certain time, the test and control groups each change in value but by different amounts. A third type of natural experiment can be detected where an input for a test group starts at a first value and an input for a control group starts at a different value; and at a certain time, the control group input remains at its value and the test group input changes in value. Another aspect includes identifying a delay period where a value of an input is substantially transitioning from a first value to a second value; and comparing the value before the delay period with the value after the delay period. Another aspect includes aggregating the historical data to eliminate noise. The historical data can be aggregated for each of a plurality of time periods. Another aspect includes extending the length of the experiment for a time period after the detected experiment, wherein the extended range has an upper bound and a lower bound for a value of the input; and receiving a selection whether to use the extended range. Another aspect includes extending the length of the experiment for a time period before the detected experiment, wherein the extended range has an upper bound and a lower bound for a value of the input; and receiving a selection whether to use the extended range. Another aspect includes eliminating a detected experiment wherein a value of the input corresponds to a change in a market factor. Another aspect includes receiving a selection of at least one filter criteria; and eliminating any detected experiments that do not meet the filter criteria. Outputting can include presenting a list of at least one experiment and changes in value of the input in the at least one experiment. Another aspect includes receiving a selection of an experiment; and presenting a change in a value of an input for a test group based on the selected experiment.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 10 shows an extended experiment according to an exemplary embodiment.

FIG. 11 shows an experiment with a confounding action according to an exemplary embodiment.

FIG. 12 shows an output of experiments according to an exemplary embodiment.

FIG. 13 shows detail of a particular experiment according to an exemplary embodiment.

FIG. 15 shows a selection of experiments according to an exemplary embodiment.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Generally, if a client wants to know the effect of a change in one metric (e.g., the effect of an increase in inventory), the system analyzes a stream of historical data to identify natural experiments. In an effort to find a natural experiment, the client's historical data can be analyzed to find stores whose inventory spiked or dropped while the inventory of other stores did not spike or drop at the same time. When such an instance occurs, the system informs the client that a natural experiment has been found and may be useful for the client's analysis of the business initiative.

Figure 1:
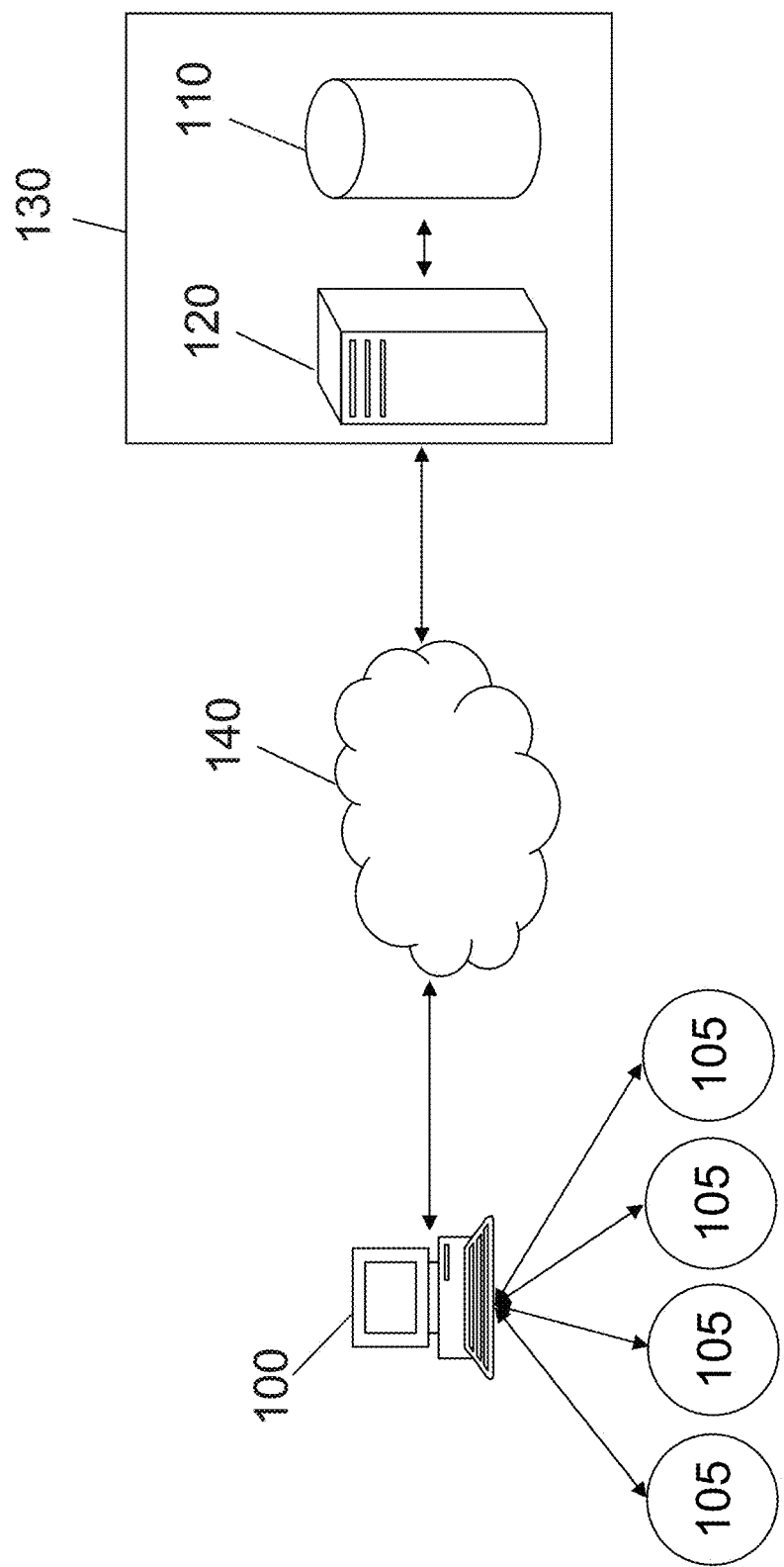
FIG. 1 shows a system overview according to an exemplary embodiment.

Referring to FIG. 1, an exemplary system diagram is shown. A client has a business network comprised of various entities 105, which may be business locations, stores, sites, students, accounts, customers, products, services, regions, patients, or other types of entities. Although the exemplary embodiment often refers to the entity as a "store," it is intended that any type of entity can be used. The entities 105 may provide similar products and/or services to customers. In some embodiments, the entities 105 may be geographically dispersed.

A client computer 100 can represent one or more computers of the client, who may manage the various entities 105 or track data regarding the entities 105. In one example, for a consumer business, the client can be an organization headquarters or a marketing division for one or more entities 105 (e.g., a grocery store chain that determines which products and/or services each retailer location should provide). In some embodiments, each entity 105 can have its own client and computer 100. In other embodiment, a client and the computer 100 can be used for multiple entities 105. One or more users (not shown) may operate the computer 100. The computer 100 can be a desktop computer, workstation, laptop, personal data assistant, tablet computer, mobile phone, or any other similar computing system operated by a user. The computer 100 may use its processor to execute browser software stored in memory that enables a user to request, receive, and render information from a network 140.

The network 140 may be a shared, public, or private network and may encompass a wide area or a local area. The network 140 may be implemented through any suitable combination of wired and/or wireless communication networks. For example, network 140 may be implemented through a wide area network (WAN), local area network (LAN), an intranet, and/or the Internet. Further, network 140 may represent multiple networks, such as a wireless carrier network connected to the Internet.

The computer 100 transmits or otherwise provides historical data regarding entities 105 to a host entity 130. In this exemplary configuration, the host entity has a server 120 is coupled to the database 110, though the server 120 and the database 110 can be combined into a single device or each comprise multiple devices. The server 120 can be a computer system such as a desktop computer, workstation, or any other similar server side computing system that performs one or more service-side processes. The server 120 can have an interface unit for communicating information to and from the client's computer 100 over the network 140. In some embodiments, the server 120 may communicate with another server, such as a web server, that can more directly communicate over the network 140. The server 120 can use its processor to execute a computer program stored in memory that can access and analyze the data stored in the database 110.

The database 110 can comprise one or more memory devices that store data and/or executable software that is used by the server 120 to perform processes consistent with certain aspects described herein. The database 110 may be located external to server 120 and accessible through the network 140 or other network, such as a dedicated back-end communication path. In one embodiment, the database 110 can be located at the client or another location, such as with server 120. The database 110 can be populated with records about the client's historical data for various locations, sales, promotions, pricing, personnel, and the like. The client computer 100 can communicate with the server 120 to request analysis and view results.

In one embodiment, the client uses computer 100 to communicate over the Internet 140 with the host entity's server 120. The computer 100 may use a thin client, such as a web browser, which accesses a website hosted by the host entity 130. The client may be prompted to enter a username and password into the web browser on the computer 100. The client can be authenticated to access data and perform analysis of that data. Alternatively, the client may request that another entity, such as the host entity 130 perform the analysis of their business initiative.

Figure 2:
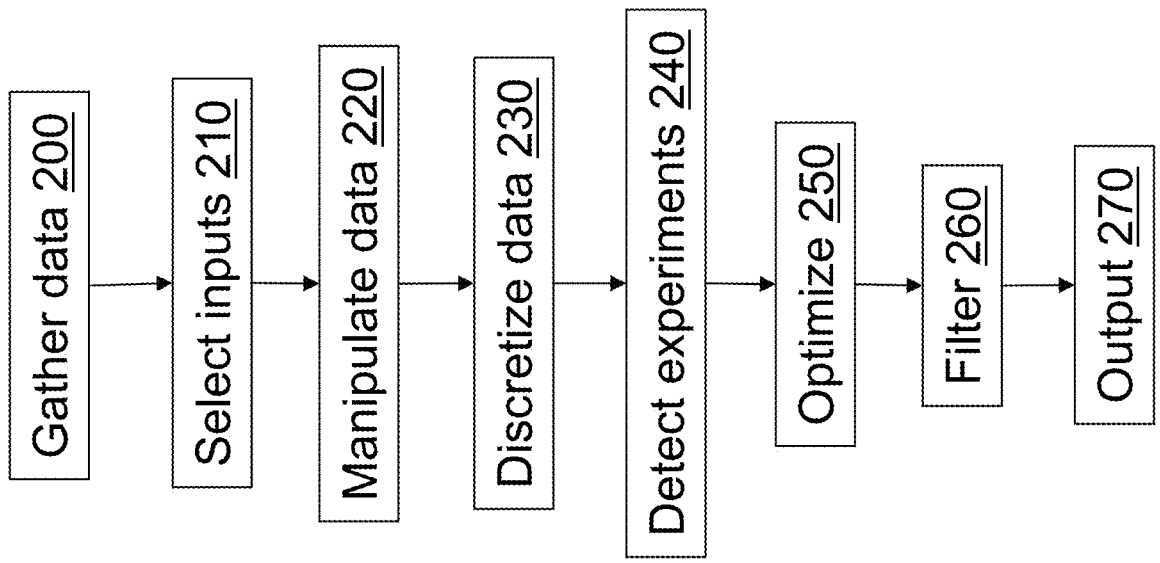
FIG. 2 shows a flow chart of a method according to an exemplary embodiment.

Referring to FIG. 2, an exemplary method is shown. At 200, data is gathered over time to collect all historical data for a client. The historical data can be collected and stored in a database. Alternatively, the data can be gathered by a client and transmitted to a host entity for analysis of the data once all of the data has been collected.

At 210, a user selects inputs for the historical data, which can be used to determine the type of experiments to be identified. In an alternative embodiment, inputs can be automatically selected based upon the type of historical data or the nature of a client's business. Exemplary inputs include a metric, a timeframe, a list of entities, a minimal change, a minimum experiment size, a minimum number of test entities, a minimum number of control entities, a difference between the minimum number of test entities and a minimum number of control entities, labor hours, media expenditures, geographic media use, a weather metric, a geographic limitation, an entity list, a minimum experiment pre-period length, a minimum post-period length, an external market factor, a delay time period, a number of time periods to aggregate, unemployment rate, coupon redemption rate, inventory levels, space allotment (e.g., linear shelf space), and customer survey scores. A "metric" can be the dataset to be scanned for historic changes (e.g., price). A "timeframe" can be a specific period of time (e.g., the most recent two years of data), whereby the selected dataset can be optionally filtered for only that timeframe. The timeframe can be used to search a relevant period for a natural experiment, but the experiment may occur within only a fraction of the time within that timeframe and not extend the entire period. An "entity list" can be a specific set of entities (e.g., all stores that have been open for at least two years), whereby the selected dataset can be optionally filtered for only that entity list. In one example, the entity list can be based upon location, whereby the list includes all entities in that location. A "minimal change" can be the smallest possible change in the metric being scanned that is of interest to the user. Natural experiments involving changes smaller than this will be excluded from the final results (e.g., $0.50). A "minimum experiment size (test and control)" can be the smallest acceptable number of test locations and control locations for a natural experiment to be considered big enough to be of interest. These user inputs are merely exemplary and may change as long as it remains within the scope of this description.

Inputs can include any combination of different attributes, such as a date range or timeframe, price range, or other data attributes. In most instances for analysis on behalf of a retail business, the selected inputs may include at least a metric (e.g., price) and timeframe (e.g., all historical data, 2 years, 10 years, 2 weeks). In some instances, only a metric (e.g., price) is selected as an input. Other inputs can be used to further filter the data, such as by selecting certain locations or advertising expenses. In an exemplary embodiment, the user may choose to look for experiments that are as long as possible. The selection of inputs allows for filtering of the gathered data to select only the applicable historical data.

At 220, the data is optionally manipulated. In some instances, it may be sufficient to search for experiments in the selected metric "as is." For example, television target rating points (TRPs) may already be normalized. However, it may be advantageous to manipulate the metric or other input before searching for experiments. The user can decide whether to manipulate the data, which can be done in at least two ways: (a) normalization, and (b) category indexing. In one embodiment, the client or other user can select the method of manipulation. In another embodiment, the system automatically chooses the type of manipulation.

Normalization may be used where the metric size varies greatly. In certain instances, when metric values are of widely different magnitudes across locations, it may be more useful to search for experiments that identify consistent percentage changes rather than absolute changes. When looking for natural experiments in labor allocation, entities (e.g., stores) of different sizes may have very different magnitudes of values (e.g., total labor hours). For example, a large store may have many more labor hours than a smaller store. So in order to be able to find entities that exhibit equal shifts in such a size-dependent metric, for example, the data can be normalized to use more relative terms. In one example, the user can compare percent changes (e.g., 10% increase in labor hours) rather than absolute changes (e.g., 100 hour increase in labor hours). In such a situation, the metric can be normalized for each individual entity. This normalization can take one of a few different forms.

In one option, all values in the time period for each location can be divided by the average for that location over the entire time period. This sets the average of all stores to 100% and allows the natural experiment finder to look for similar deviations in averages across multiple locations.

In a second option, all values in the time period for each location can be divided by the first value in the period for that location. This sets all locations on an equal level at the start of the search period and looks for similar relative deviations from the initial period.

In a third option, the data can be re-normalized for each individual reporting date by dividing all values in the time period by this reporting date's value for each entity. This re-sets an equal baseline for each reporting date and allows the user to search for experiments where there is consistent relative deviation across entities using any date as a starting point.

The data can also be manipulated by category indexing. Because an exemplary embodiment analyzes a price, the category indexing may be referred to as category price indexing, but it is intended that category indexing can be used for any hierarchical metric or other input. A category may include numerous products at different prices, which should be accounted for when considering a metric such as revenue per unit. In some instances, shifts may be based on a customer's purchase of a higher product prices within a category. For example, if the price of all products in a category of products remained constant over time but 10% of the customers shift from the lowest revenue product in that category to the highest revenue product in that category, the average revenue per unit for that category will increase. However, this will be caused by a change in the mix of products purchased and not by a price increase. If the goal was to find natural pricing experiments and the metric used is average revenue per unit, then without category indexing, this approach would identify what looks like price experiments but were actually just changes in the product mix. As a result, these types of shifts in the product mix should not be identified as experiments because they do not correspond to an action taken by a client (e.g., a price increase or decrease). So category indexing can account for mix shift in the distribution of the underlying products by keeping the mix constant and using it as a weighting constant, so there is no change in the metric unless at least one of the product prices actually changes. When dealing with metrics in a hierarchical category structure, it may be useful to account for the mix of the values in the underlying lower level categories.

For example, when searching for price changes in a "milk" category, which contains dozens of individual underlying products, it may not be sufficient to search the price metric as is. As a result, natural experiments may exist where price is not actually increasing or decreasing, but a shift towards higher priced or lower priced milk products causes the average unit retail metric to increase or decrease. This phenomenon is known as "mix shift" and can cause false reads in identifying experiments. In order to account for this shift and isolate only experiments where the price of underlying milk products actually changed, an index metric can be created that holds product mix constant.

In another example, if customers are buying a more expensive twelve pack of beer in a store, then there is no price increase, just a different mix of purchases within the category. So category indexing can filter out false positives for what appears to be price increases or decreases but are really shifts to more or less expensive products within that category. So category indexing allows products to be differentiated based on different categories (e.g., beer), subcategories (e.g., cans), and SKU numbers (e.g., specific SKU for a particular can of beer).

A category index metric (or price index metric) can be created by, first, determining the average product sales or unit mix across the time frame. For example, skim milk makes up 20% of the milk category on average, while low fat milk makes up the remaining 80%. Second, these mix values are used as a weighting factor for the product prices to come up with a category price index for the higher level category. For example, if in a given location on a certain date skim milk is $2.00 while low fat milk is $4.00, the price index for milk becomes:

$$0.2*2.00+0.8*4.00=\$3.60$$

Using this method, shifts in mix across individual dates and locations will not change the value of the price index metric and therefore no false experiments will be discovered. This indexing process can be further refined based on user input to (a) use mix in each individual store as the weighting factor for that store, which may be advantageous if product mix varies significantly across locations (e.g., winter coats may have a much higher product mix in colder locations); (b) use a chained index to account for variations in mix over time, which may be advantageous if product mix is very seasonal (e.g., winter coats may have a much higher product mix in the fall and winter versus the spring and summer); or (c) a combination of the two above, which may be advantageous when product mix varies significantly both across locations and over time.

The category index can be based upon a mix of products or some other attributes. For example, the category index can be based upon store level rather than a mix, because a mix may not be consistent across all stores. In another alternative, the price index can account for variations over time, such as analyzing the values (e.g., at a store level or mix) on a weekly basis.

Chain indexing is a time dependent index that can account for variations in mix over time. For example, if a store has a first product that makes up about 60% of sales in a category and a second product that makes up about 40% sales in a category, then the weighting factors will be determined based on those percentages. But those percentages may change over time. If the second product increases from 40% to 50% from one period to another period, then those percentages can be averaged (45%) for a weighting that accounts for the variation over time.

At 230, the data is discretized to determine which values should be considered equal. Because finding a natural experiment involves finding control stores that do not change over a certain period of time and finding test stores that exhibit a similar change at the same time, continuous metrics (such as price) can be converted to a discrete metric that defines which stores are at a substantially similar level on a given date. When looking at continuous data, it can be difficult determining which data is considered equal so that it can be determined where shifts occur. For example, in some instances, values of 4.99 can be considered the same as 5.00 and 5.01. In other instances, these values are very different and should be treated as such. The data can be automatically divided into different buckets using percentages (e.g., 25%) of the standard deviation of the underlying data set. The data can also be divided using other fractions or multiples of the standard deviation. In one embodiment, the client can override this bucketing division and choose another division of data (e.g., $1.00 divisions). In another embodiment, the system can show a discretization to the client, and the client can choose whether to revise the discretization.

All inputs can be optional and an automatic bucketing scheme can be employed with a user override. A user can say that the user wants buckets for each dollar increment instead of the automatically-divided standard deviation-based buckets. When looking for similar changes, need to know that 6.99 to 7.50 is the same as 7.01 to 7.49. In one output of the system, the user can see where the dividing lines are drawn and can adjust the divisions as desired. So if a given price dataset ranges from $5 to $9 across all relevant stores and over all relevant time, it is first determined which range of prices would be considered similar enough. In this example of a dataset ranging from $5 to $9, a sample discretization scheme can be $5-$6, $6-$7, $7-$8, and $8-$9.

Figure 3:
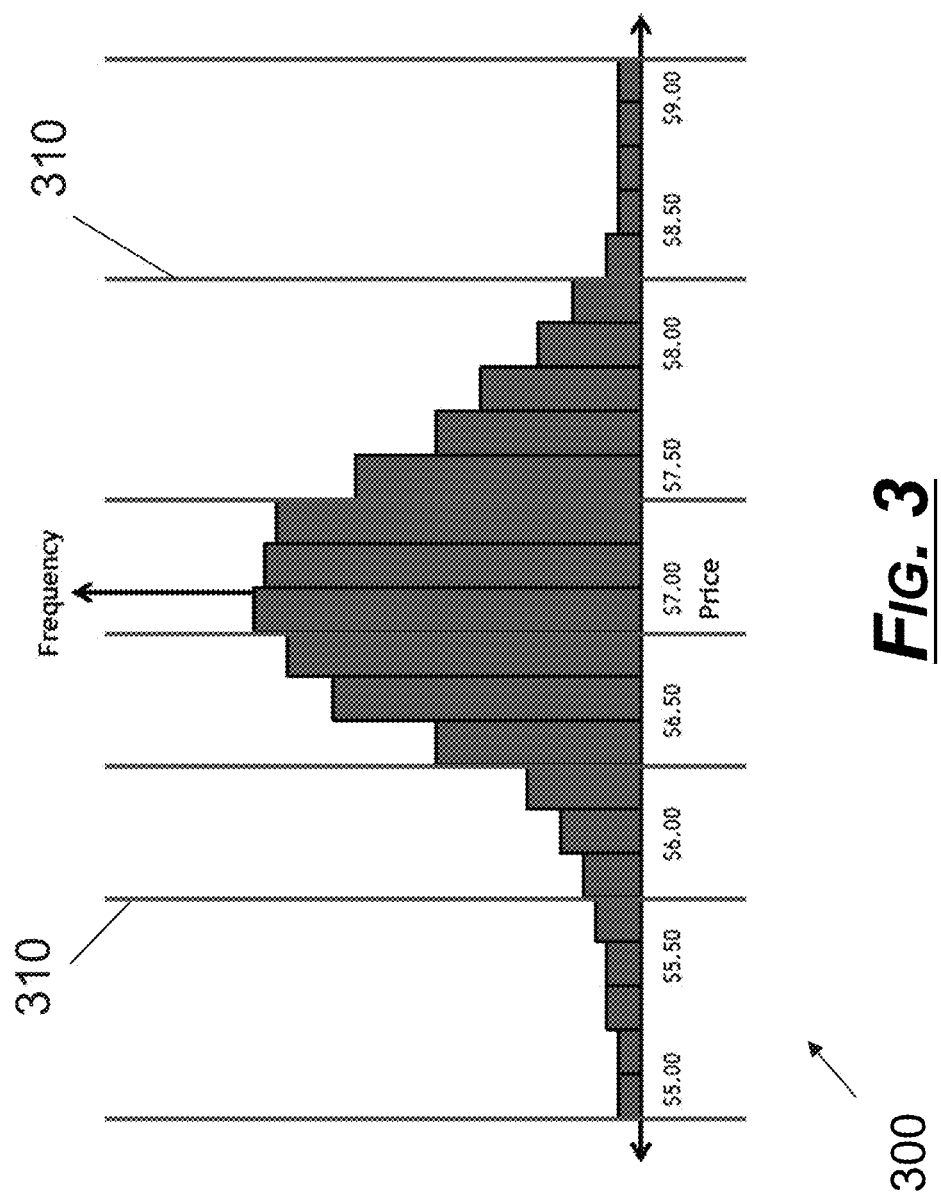
FIG. 3 shows a dataset discretization according to an exemplary embodiment.

Because the discretization scheme is not always readily apparent, the distribution of the underlying data set can be used to come up with these ranges. For example, the standard deviation can be divided by four as a "bucket size" and the data can be split into these equal sized buckets such that the mean of the data falls into the middle of a bucket. As shown in FIG. 3, an exemplary dataset 300 of a price range $5 to $9 is shown. For this exemplary dataset 300, range limits 310 are illustrated based upon this exemplary method. Assuming a normally distributed dataset as a baseline, the dataset can sometimes have about 20 to 30 distinct buckets. This automatic bucketing algorithm can be replaced by an optional user input to customize the bucket definitions.

Figure 4:
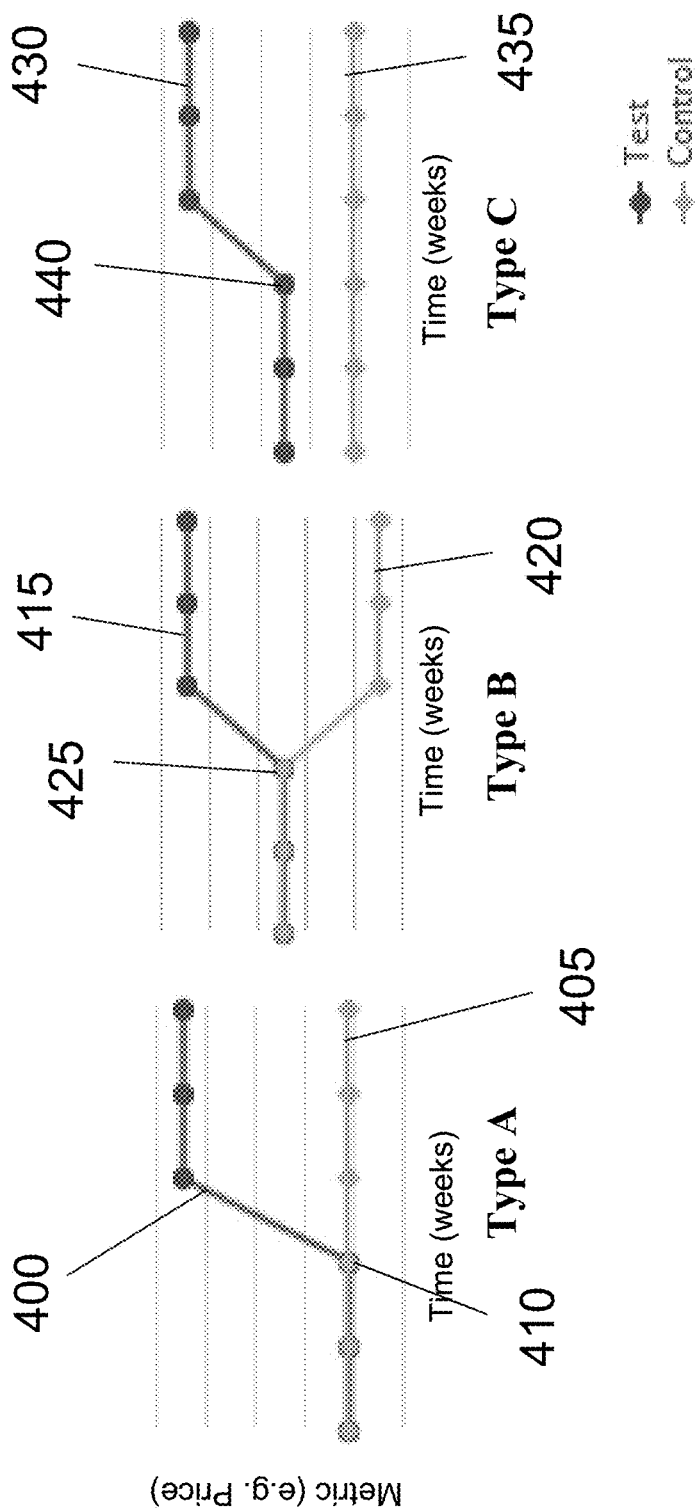
FIG. 4 shows experiment types according to an exemplary embodiment.

At 240, experiments are detected. Once the metric data has been discretized into ranges, every individual pair of adjacent dates is evaluated sequentially as a possible natural experiment date. For each pair of adjacent dates, at least three scenarios can be observed: type A experiments, type B experiments, and type C experiments. A user can choose whether to see all types of experiments or only one or more specific types (e.g., type A experiments only). Referring to FIG. 4, experiment types are shown on a plot of price versus time for two groups of stores.

Type A experiments can be considered the most ideal or optimal type of experiments, where a test group 400 and a control group 405 start at the same level for the metric in question, but at some point in time 410, the test group 400 shifts away while the control group 405 remains the same. Type A experiments may look for a percent or absolute change in a test group where there is no change in the control group. For example, all stores begin by pricing an item at $50, but after a period of time, some stores charge $100 and some stores continue to only charge $50.

In type B experiments, a test group 415 and a control group 420 start at the same level, but at some point in time 425, the test group 415 and the control 420 both shift. Type B experiments may look for a percent or absolute change in a test group as compared to a different percent or absolute change in the control group. Although there may be some shift in the control group at the same time that the test group changes, the difference between the test and control groups can be useful for this analysis. For example, in a type B experiment, a test group and a control group start by pricing an item at $50, but the control group decreases the price to $25 and test group increases the price to $100.

In type C experiments, a test group 430 starts at a different level than a control group 435, and at some point in time 440, the test group 430 shifts. The test and control groups may not have been equal in the period before the shift of the test group, but can still provide a consistent measure if the control group did not have any action (i.e., increase or decrease). For example, one group may not have any television advertisements and another group already has $50,000 in advertisements and increases to $100,000 in advertisements. In order to determine the effect of the $50,000 increase in advertising spend in the test group, the control group without any advertising spend can still be used to establish the baseline of what would happen if there was no change in advertising spread.

The user can determine the attributes of the experiment or which type of experiment should be used for analysis. For example, in determining whether to implement a price increase to increase sales, the user may want to consider only experiments that show a price increase within a more limited period of time (e.g., two weeks) as opposed to a longer time for a return (e.g., two years). The user can also determine whether to proceed based upon the type of experiment. For example, the user may not wish to proceed with a type C experiment.

Figure 5:
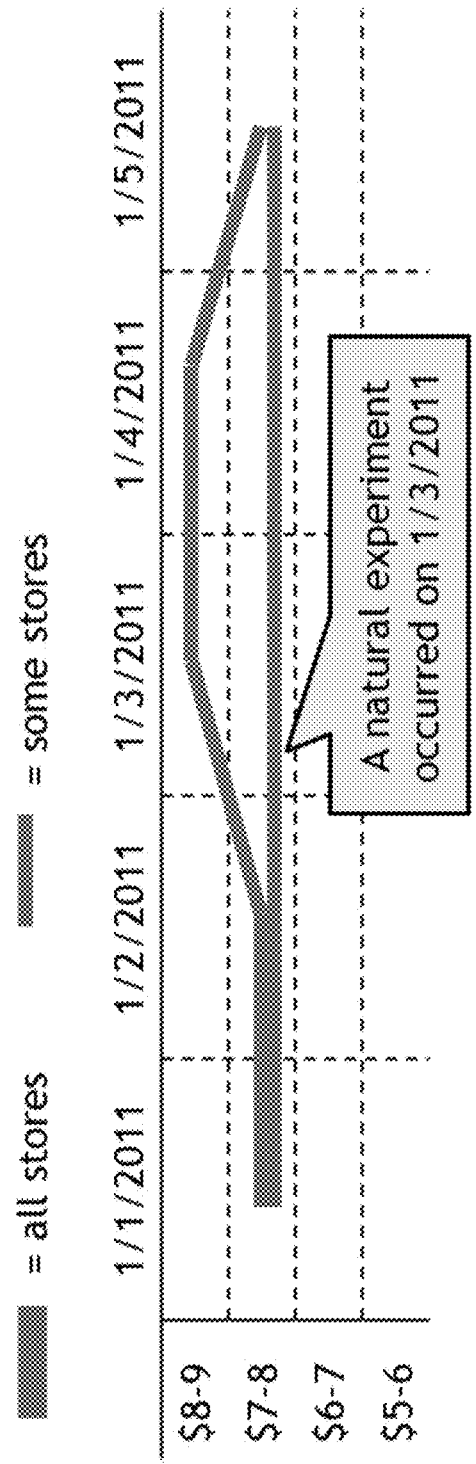
FIG. 5 shows an identification of a natural experiment according to an exemplary embodiment.

If there is both a critical mass of control entities (as defined by the inputs), and a critical mass of test entities (as defined by the inputs) meeting one of the experiment type criteria above, this can be marked as a natural experiment found on this date, as shown in FIG. 5, where a type A experiment was identified on Jan. 3, 2011. In some instances, multiple experiments may be found a single date.

In addition, the dataset can optionally be refined to account for noise using experiment delay and aggregation periods. In some instances, natural experiments do not have a clear and immediate transition from one period to the next, or data might not reveal an ideal shift, but over the course of a period, the data may eventually become more steady. For example, a particular business may increase price in several increments before settling on a steady-state price. In this case, it may be advantageous to include a delay period that can be ignored while searching for natural experiments.

Figure 6:
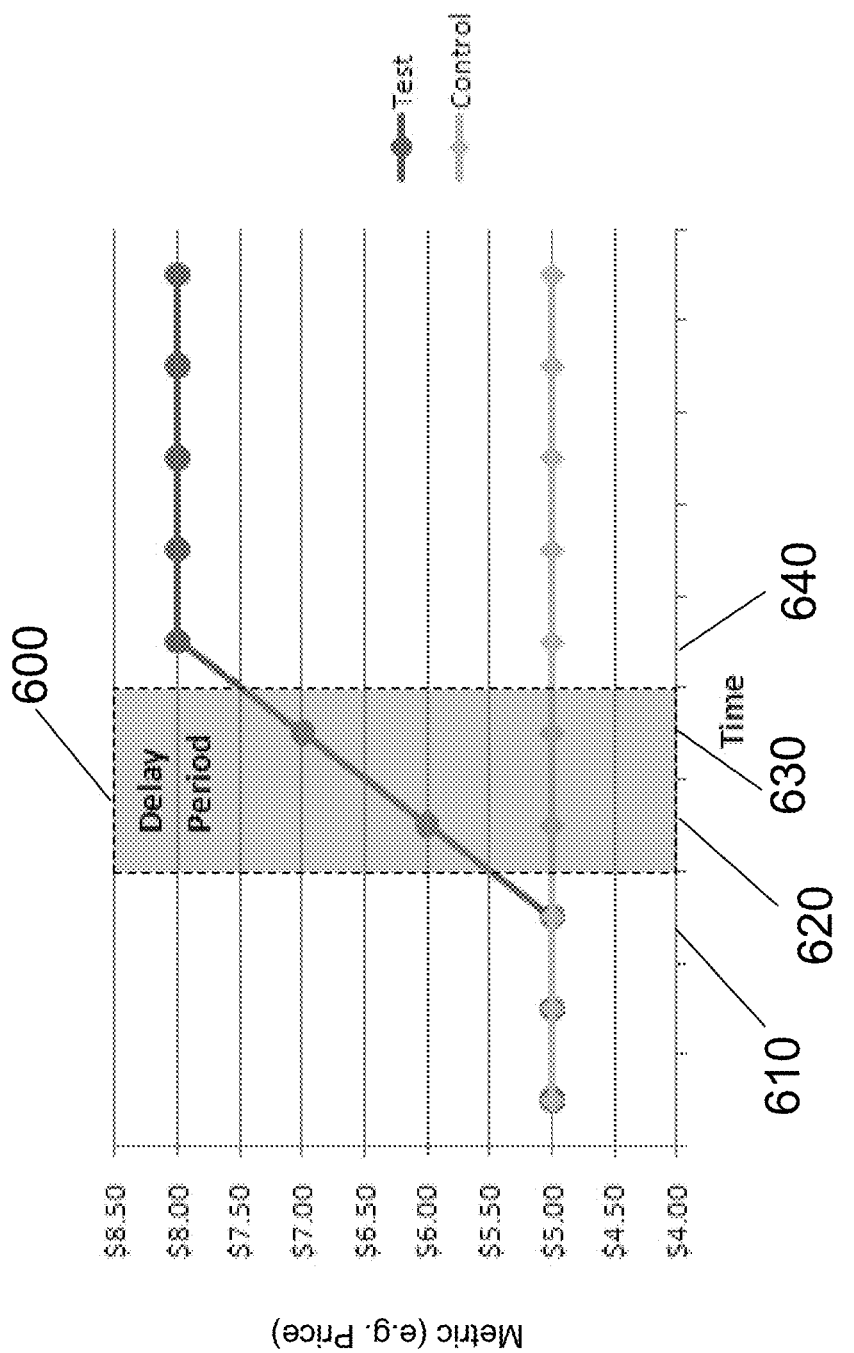
FIG. 6 shows a delay period according to an exemplary embodiment.

In the scenario shown in FIG. 6, for example, it may be optimal to exclude a delay period 600, which encompasses two time periods. Instead, the experiment can be described by the periods before the delay period 600 and the periods after the delay period 600. When accounting for the delay period 600, experiment detection methodology remains the same, but rather than comparing two subsequent time periods, other time periods may be compared (e.g., compare time periods 610 to 640 while ignoring periods 620 and 630). In one embodiment, the system can automatically identify a delay period. In another embodiment, the user can configure a delay period or request the detection of a delay period.

Figure 7:
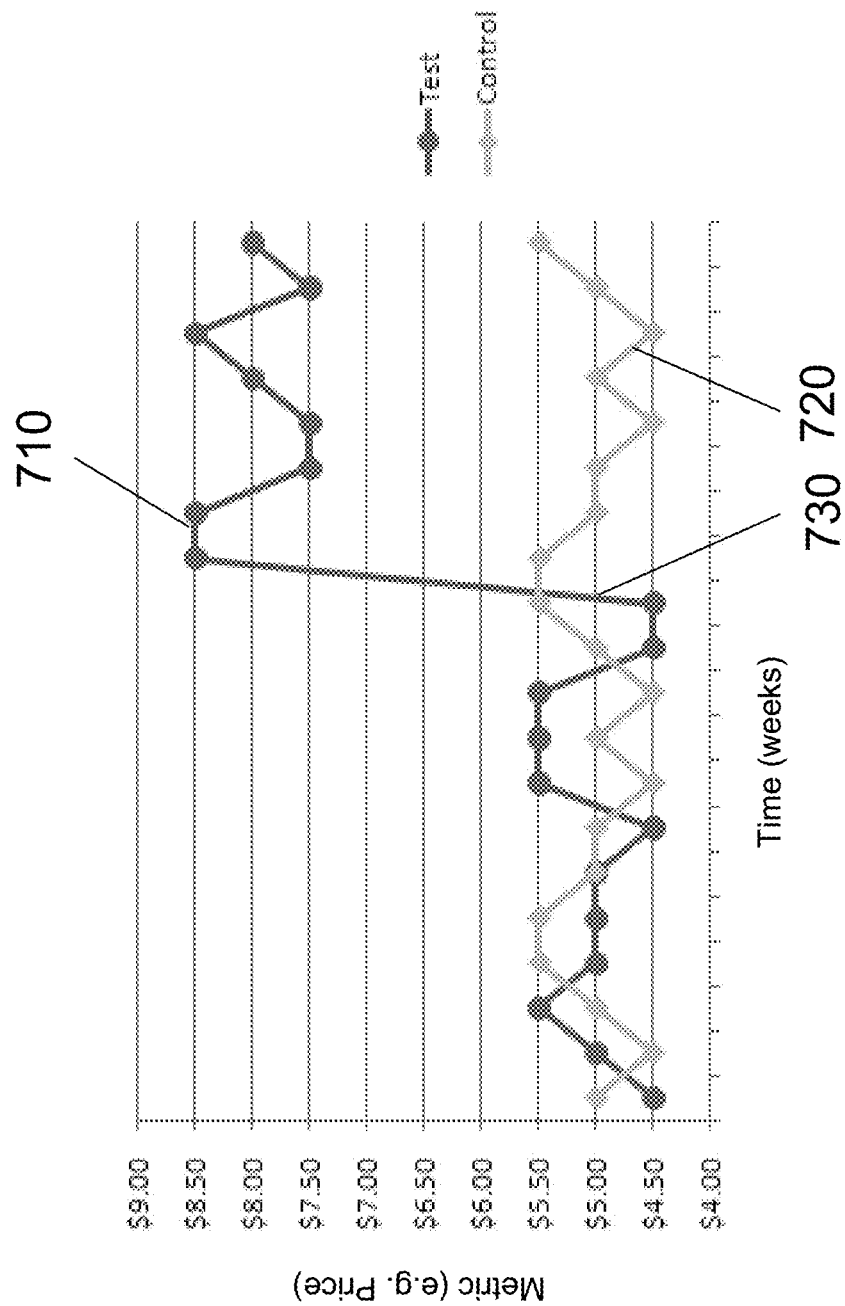
FIG. 7 shows a dataset with noise according to an exemplary embodiment.

When the metric is significantly noisy, it may be necessary to aggregate several individual time periods into one data point for the search process. For example price may fluctuate from week to week due to promotions and sales, but is relatively stable over a longer period of time. Because it may be more desirable to find the larger, longer-term changes, the data can be aggregate over several periods to create a steadier signal. As shown in FIG. 7, both test entities 710 and control entities 720 fluctuate significantly over the entire time period. Though there is a shift in the test stores from around $5.00 to around $8.00 in time period 730, it may be difficult to detect the shift using the data as is given this noise.

Figure 8:
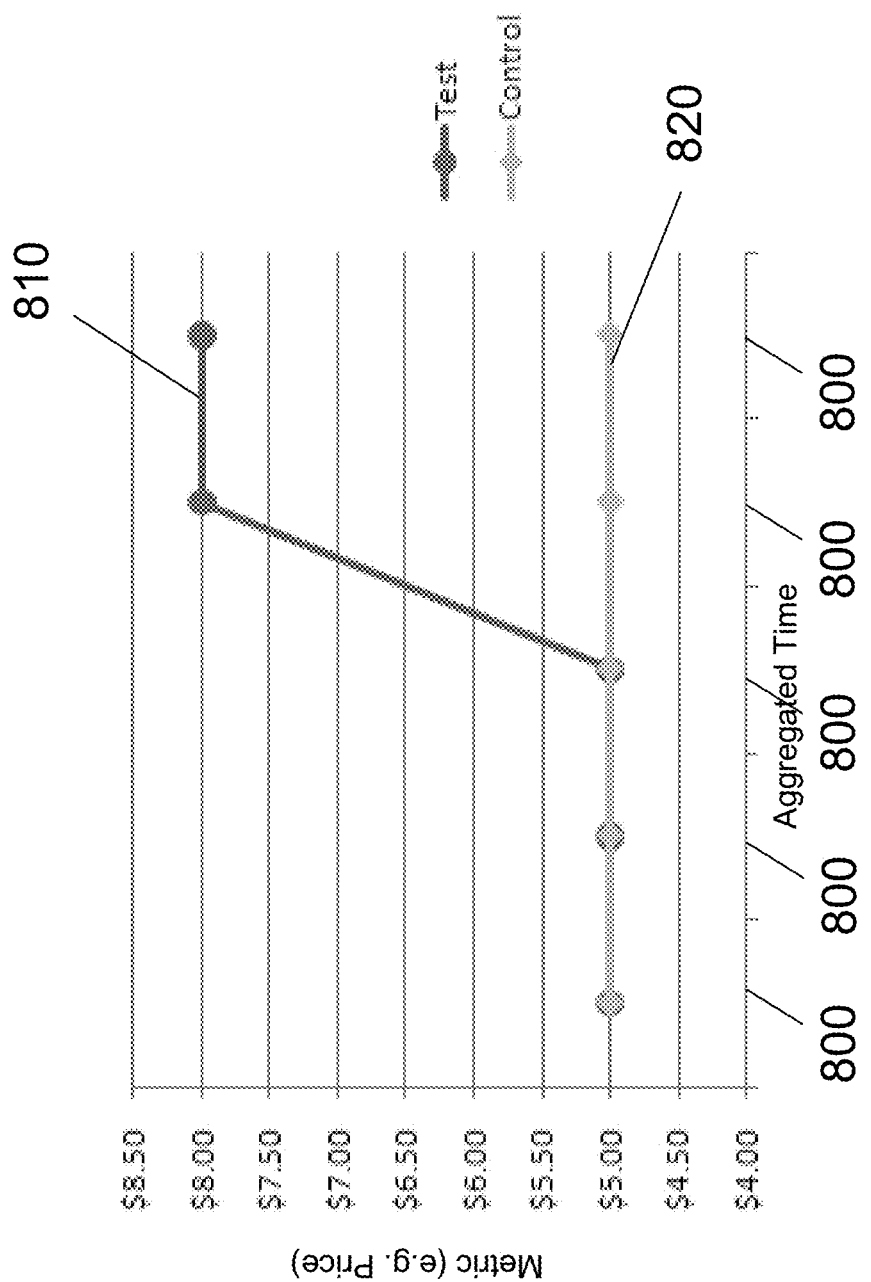
FIG. 8 shows an aggregated dataset according to an exemplary embodiment.

In order to reduce the noise, several time periods can be aggregated to come out with a smaller set of periods 800 as shown in FIG. 8. As a result, the natural experiment can be more easily detected using the same algorithm described above. A shift in the data from $5.00 to $8.00 is more apparent after the data for a test entity 810 and a control entity 820 has been aggregated. One method of aggregation is to use rolling averages. For example, for any given day, instead of using the price on that day, this method could consider the average price over that day and the previous several days. Another method is to just combine data points. For example, daily metric data could be aggregated to weekly metric data. Iterating over various aggregation periods can present the optimal way to describe the underlying data and thus the optimal set of experiments.

A delay period can be used along with aggregation of the data. In most instances, the data will first be aggregated before a delay period is calculated. In some embodiments, as the data is aggregated, a transition period can be automatically determined and identified as a delay period. However, the delay period can be determined before, during, or after aggregation.

At 250, the data can be optimized. For any given basic experiment detected, there are actually many different versions of the experiment that could be returned, depending on which subset of test and control entities are included. For example, including different specific test stores may result in a different "length" of the experiment (before and after the initial separation). The natural experiment may extend further in either direction (before or after) beyond the originally-identified natural experiment occurring during a certain time period. Because a shift is likely not maintained at the same rate, it may increase again or decrease. So the first step is to determine how far the experiment can it be extended, and how many entities (e.g., stores) would be lost by the extension. By increasing the experiment another week, how some stores may no longer provide relevant data. So the user may have an option of determining whether to prefer a shorter experiment (e.g., one week) with multiple entities (e.g., three stores) or a longer experiment (e.g., three weeks) with fewer entities (e.g., one store).

Figure 9:
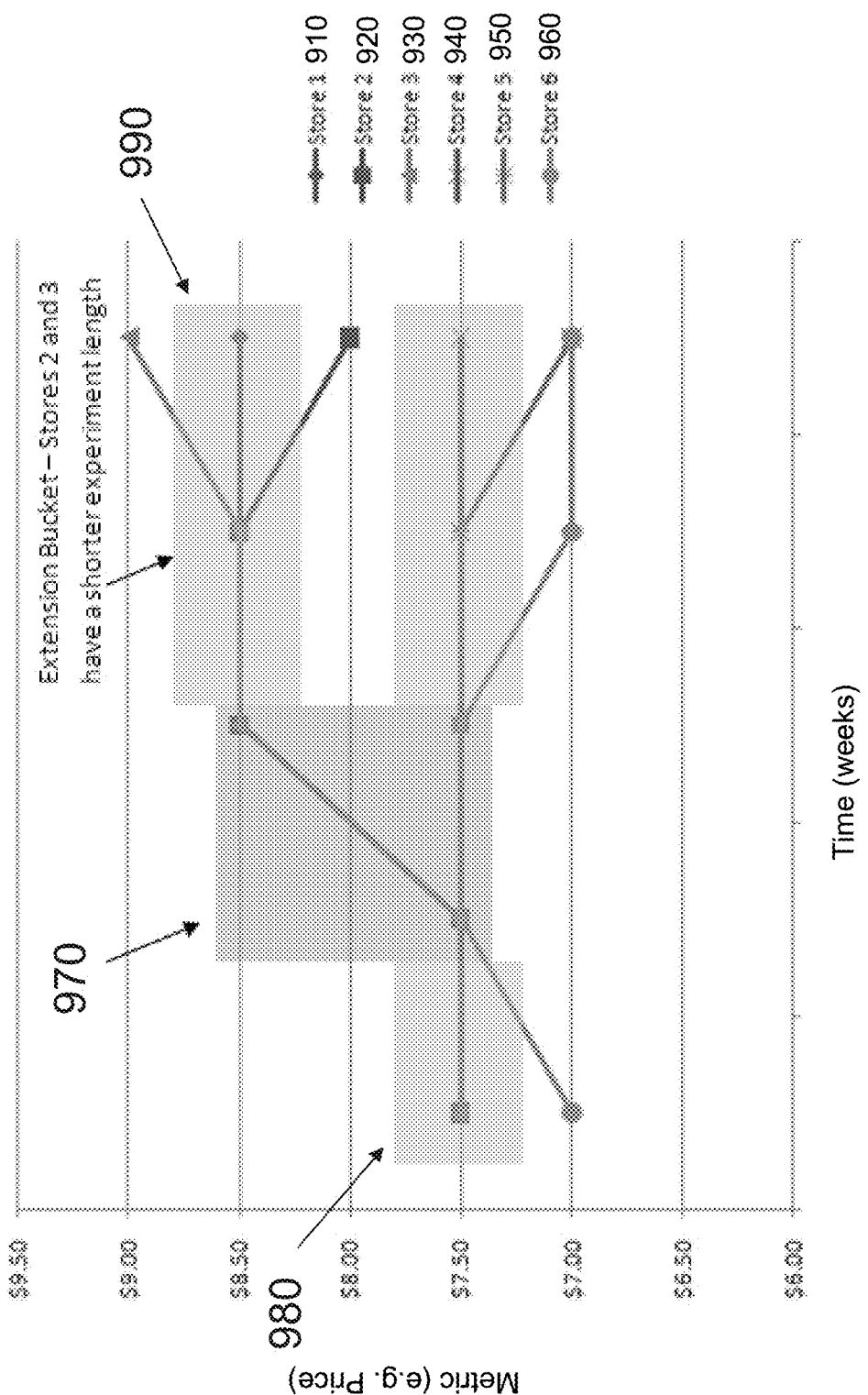
FIG. 9 shows an extended experiment according to an exemplary embodiment.

Referring to FIG. 9, for each test store 910, 920, 930 and control store 940, 950, 960 in the dataset, a maximum experiment length can be determined both before and after an experiment date of a detected experiment 970. For each of four buckets (test stores before the experiment, test stores after the experiment, control stores before the experiment, control stores after the experiment), the system can calculates an extension range 980 before the experiment date and an extension range after the experiment date 990. The extension ranges 980, 990 are centered on the mean of each of the four data sets and have an upper bound of the mean plus 2.5758 times the standard deviation or the maximum point in the data set, whichever is larger. Similarly, the lower bound is the mean minus 2.5758 times the standard deviation or the minimum of the data set, whichever is lower. Although a z score of 2.5758 is used in this exemplary embodiment, it is intended that any z score or other factor can be used based upon a desired predictability (e.g., a z score of 2.5758 corresponds to 99%, whereas a z score of 1.960 corresponds to 95%). This automatic length extension range can be optionally replaced with a user input indicating the size of the range that should be used for any experiment. With those four ranges, the system can determine a maximum length before and after the experiment date for each store.

Referring to FIG. 10, a table is shown where a natural experiment includes test store 1, test store 2, test store 3, control store 4, control store 5, and control store 6. The experiment length is one day, Jan. 3, 2011, and is not extended before or after. In FIG. 9, a similar experiment is shown as experiment 970. The experiment can be extended two days before (including January 1 and January 2) and two days after (including January 4 and January 5). In FIG. 9, a similar extended experiment is shown with ranges 980, 990. However, due to the extension, only test store 1 and control store 4 provide relevant data because the other stores have data points that are outside of the extension range, for example, as shown by the range 990 in FIG. 9 that excludes a data point from store 920. As a result, the extension of the test may eliminate test stores and control stores.

The tradeoffs between these different experiment lengths can be automatically balanced based on advanced preferences inputted by the user (e.g., "I prefer experiments that last longer to experiments that involve more locations."). By default, absent a user's settings, long experiments may be preferred to experiments with more entities. This balance can be done in absolute terms, for example maximizing experiment length while making sure to maintain the minimum thresholds for number of test and control stores, or it can also be done using relative weights of each of the criteria.

In addition to experiment size and length, there are other criteria that can be optimized for each experiment. There may be several factors that can cause a test versus control bias depending on which stores are included in the experiment. For example, it may be important to include test stores and control stores that are well matched in terms of population density or income level, while excluding stores from either bucket which would cause significant bias on these criteria.

Detection and optimization may also include the consideration of market factors, such as actions of competitors. For example, when looking for pricing experiments within a certain category or product, it may be useful to require that there be no change in the price of other categories during this time, so that the resulting experiments are as clean as possible. In order to create these clean experiments, the same experiment detection algorithm can be used on one or several other metrics to find all instances of significant change for individual stores across those metrics. All of the experiments for the primary metric can be cleaned by first eliminating experiments that completely coincide with changes in the confounding variable(s), and then taking these other changes into account on an individual store level when optimizing each experiment. Referring to FIG. 11, for example, returning to the previously described experiment in FIG. 10, an experiment length of an individual store may be shortened due to action in another metric. In this example, on Jan. 4, 2011, store 1 saw a change in competitor price, so the data from January 4 and January 5 should no longer be included in the experiment. Preferably, an experiment isolates a variable (e.g., price) to measure an increase in price where the competitor does not change its price, rather than measuring an increase in price when a competitor lowers its price. If all of the data is affected by a confounding action, then no experiment will be reported.

At 260, the data can be filtered. Once a list of optimized experiments has been produced, the system can automatically filter out all experiments that do not meet user-defined quality thresholds. The user-defined thresholds can be limits on given inputs or optional inputs that have not been considered. The filtering does not affect the identification of a natural experiment, but it will determine which results should be included in the output. For example, the system can require that (a) experiments must last a minimum timeframe (e.g., at least 4 weeks); (b) experiments must involve a minimum number of test stores (e.g., at least 20 test stores); (c) experiments must involve a minimum number of control stores (e.g., at least 50 control stores); (d) experiments must involve certain change in the metric (e.g., a price change of between $2 and $3); (e) experiments must have occurred during a non-promotional time period; (f) experiments must have a reasonable degree of similarity between test and control locations (aside from the price change, e.g., no geographic or demographic bias); (g) experiments must only be of the type A format; (h) a length of a pre-period before the experiment; and/or (i) a length of a post-period after the experiment.

Figure 12:
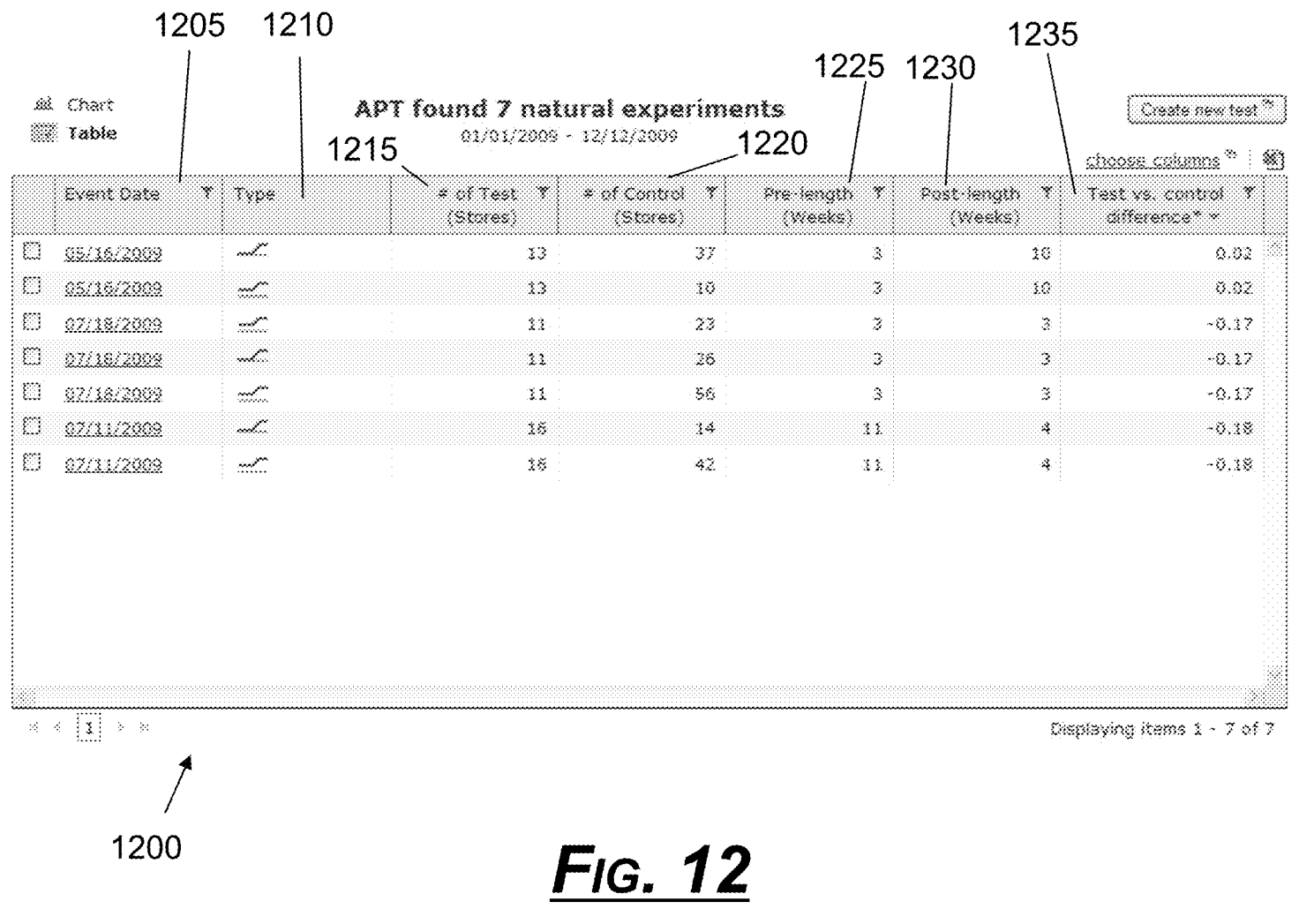

At 270, the results are output from the system to the user. As shown in FIG. 12, a table 1200 or report can be presented to the user. The table 1200 displays a filter list of each of the natural experiments that were identified in the scanned dataset. This filtered list can include meta-data about each experiment including, for example, when it occurred, the type of experiment (e.g., type A, type B, or type C), how many test and control locations were involved, how long the change was sustained, the size of the change, and the degree of similarity between test and control locations. The size of the change can be the difference between the test group and control group, or can include the change in test group value before the experiment date as compared to after the experiment date.

The degree of similarity between the test and control locations can consider a bias between the test entities and the control entities. It is most desirable to minimize or eliminate the bias between the test and control groups. So the output may provide a list of facts that could be a basis for bias between the test and control groups, which may provide differences between these groups. The list can also include a degree of measurement (e.g., a score) along with an attribute, characteristic, demographic, geographic region, population density, average income, etc. When selecting test entities and control entities from a large set, there may be differences between the entities, but it is desirable that these differences appear random rather than a consistent difference between the two groups. For example, if all of the test and control entities (e.g., stores) are within one state, then a list of one or more attributes or demographics may be listed where there is some bias (e.g., a higher population, median income). In another example, if all test stores are in Indiana, but all control stores are in California, then the experiment might be biased due to some legislation or other factors that could interfere with the results. If the attributes are different between the test and control entities, then there may be some bias and the results may not be used as a worthwhile experiment. In one example, if all test sites are in urban locations and all control sites are in rural locations, then the results may not be considered valid. In one embodiment, the data can be adjusted to account for bias when filtering or optimizing the data by eliminating those experiments where the entities show a strong bias, or by eliminating individual test or control entities from an experiment to reduce bias.

The size of the change in an experiment list can be calculated as the test versus control difference. It can be determined by calculating the test value in a post period (after the experiment) minus the test value in a pre period (before the experiment), and that value is subtracted from the difference in the control value in the post period minus the control value in the pre period. For example, if the test group price increased from 10 cents to 20 cents while control remained unchanged, then there was a 10 cent change. A user may desire to only want experiments that have changes greater than 10 cents.

In this exemplary embodiment, the table 1200 shows an event date 1205, type of experiment 1210 (e.g., type A, type B, type C) shown in a graphical format similar to the plots in FIG. 4, a number of test entities 1215 (e.g., stores), a number of control entities 1220 (e.g., stores), a pre-period length 1225 (e.g., in weeks), a post-period length 1230 (e.g., in weeks), and a test versus control difference 1235. As shown in this example, the test versus control difference can be measure in a weekly price. The list of natural experiments in table 1200 can be ordered or ranked based upon user preferences or to present the best experiments at the top of the list. The list can also be filtered by the user to include only certain experiments based on any of the meta-data shown.

Figure 13:
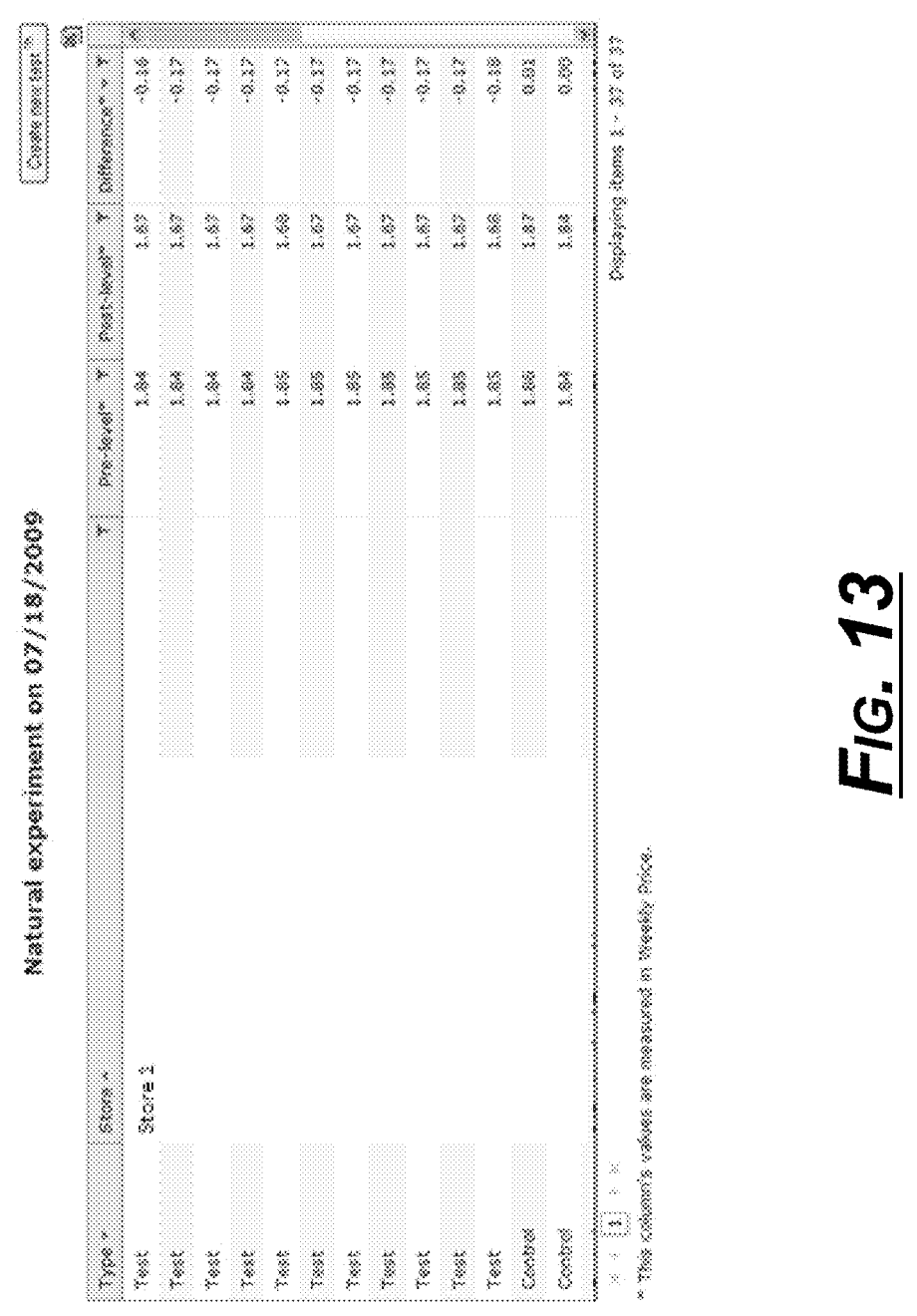
Figure 14:
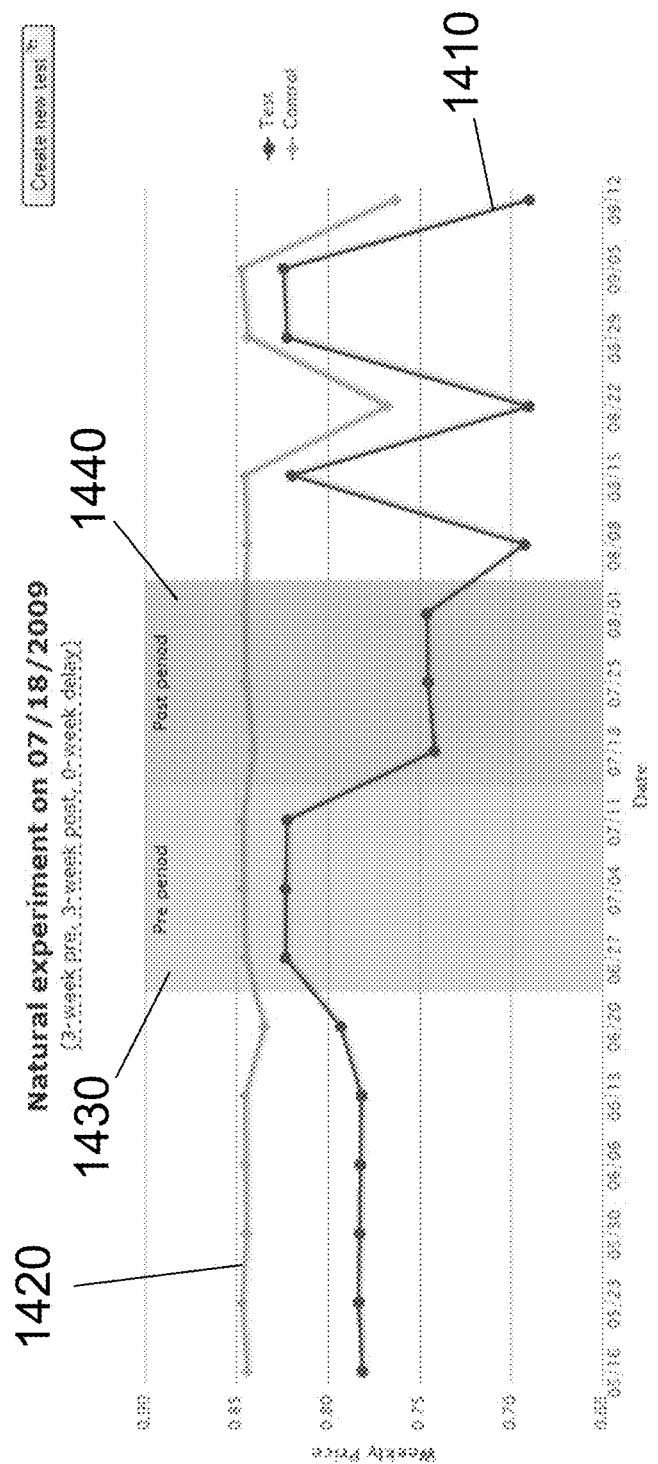
FIG. 14 shows detail of a particular experiment according to an exemplary embodiment.

For each individual experiment in the list, greater detail can be accessed in a subsequent screen including, for example, which specific locations were involved in the experiment and what their before and after levels (e.g., prices) were individually as shown in FIG. 13, a time series chart of the average test and control levels (e.g., prices) over time as shown in FIG. 14, detail on alternate versions of the experiment that were considered but discarded (similar to FIG. 10), a geographic map of the test and control locations to highlight any geographic disparity, and a report on the degree of similarity or dissimilarity (bias) between the test and control locations along crucial dimensions (e.g., store format, store size, population density, average income levels, unemployment levels, historic weather patterns). Once the system uses the raw data to identify experiments where price (or some other input) has only changed in part of the business network, the user can review details for a particular experiment, as shown in FIG. 13, such as the price changes for the test and control stores in that experiment. FIG. 14 shows further details regarding that experiment, such as a plot of weekly prices versus time for the test group 1410 and control group 1420, as well as an identification of a pre-period 1430 and post period 1440. In this exemplary embodiment, the pre-period 1430 and the post-period 1440 each last three weeks, and the experiment has no delay period.

When the user is presented with a list of experiments, the user can also review how the data was distributed. As one option, the user can determine how to change the discretization of the data by viewing and adjusting where the boundaries were drawn for the ranges in that dataset. If no experiments were found and presented in the list, then user has an option to change any metrics, attributes, or other settings to reconfigure the analysis.

Figure 15:
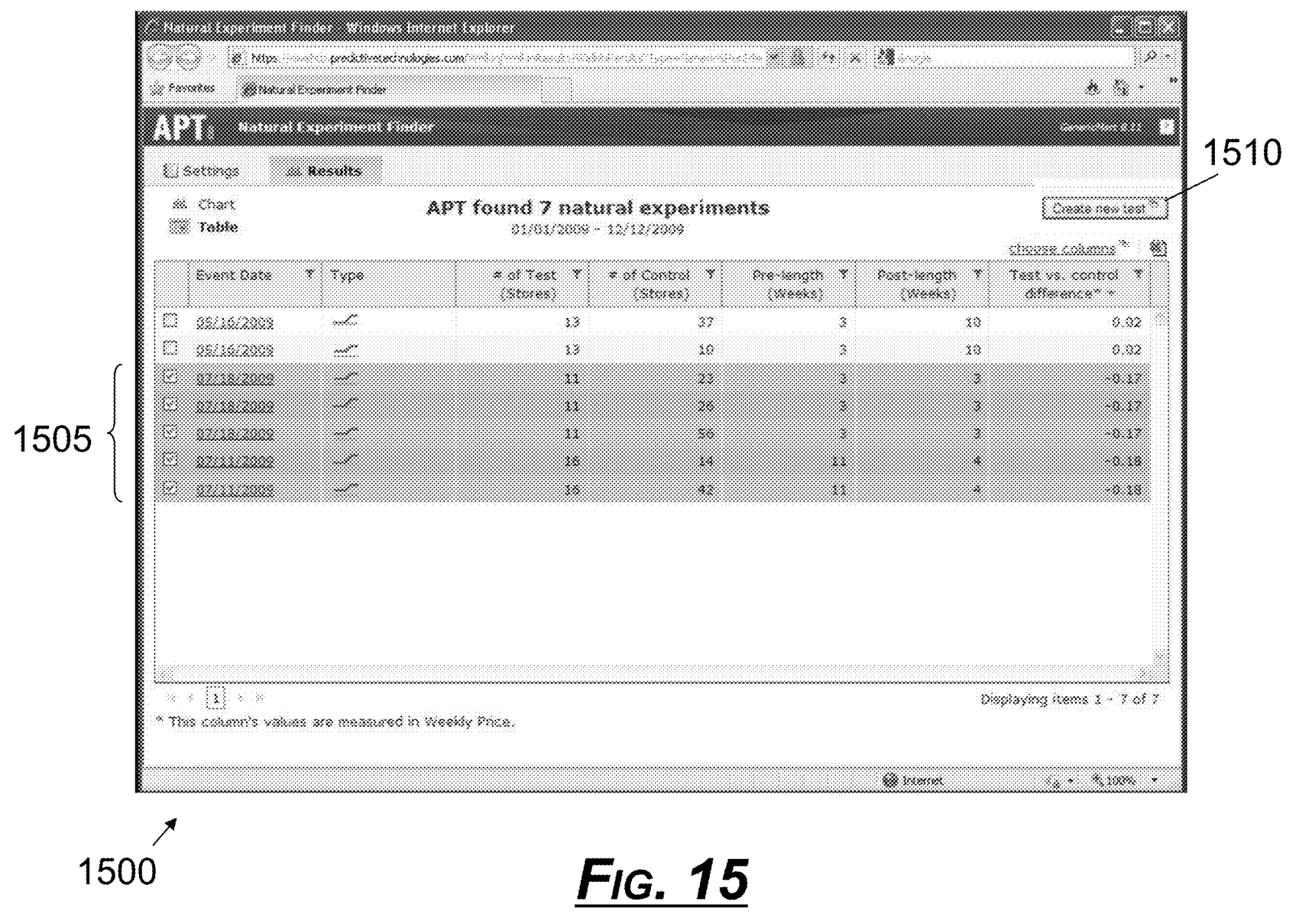

From the experiment list, users can select a subset (or all) of the experiments found in the dataset and easily transfer the test locations, control locations, and experiment dates into a best practice test versus control analytic engine to assess the net attributable impact of the change (e.g., in price) on key performance indicators (e.g., profit). As shown in FIG. 15, a user can select five experiments 1505 from the seven experiments in the list 1500. The user can then select a button 1510 for creating a new test.

Figure 16:
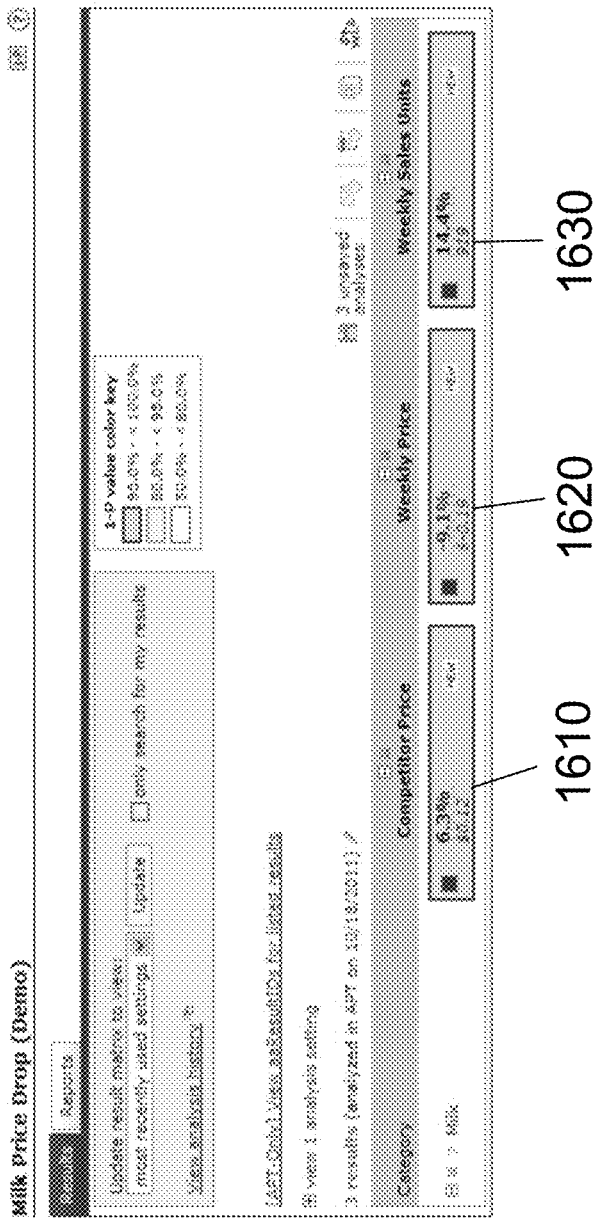
FIG. 16 shows a results screen according to an exemplary embodiment.

In one embodiment, a user can choose to view an analysis (e.g., projected sales increase based on a price change) based upon a detected experiment. The system can present to the user on the user's web browser a new page, as shown in FIG. 16. In this exemplary analysis of milk prices, the page presents a competitor price change 2210 (e.g., 6.3% or $0.12), a weekly price change 1620 (e.g., −9.1% or $−0.19), and a change in weekly sales units 1630 (e.g., 14.4% or 919 units). The page can also display the 1-p value for these figures, such as by color coding a box that contains FIGS. 1610, 1620, 1630. For example, a box may appear a first color if the 1-p value is between 95.0% and less than 100.0%, a second color if the 1-p value is between 80.0% and less than 95.0%, and a third color if the 1-p value is between 50.0% and less than 80.0%.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or "identifying" or "detecting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A computer-implemented method for identifying a natural experiment to use in an analysis of a business initiative, the method comprising:
storing, by a computer, a set of historical data in a database regarding a plurality of entities in a business network;
receiving, by the computer from a user interface of a user computing device, a selection of inputs for the set of historical data, the inputs including at least a time frame and a first performance metric;
detecting, by the computer, a natural experiment by identifying changes in the set of historical data in the database between at least two entities by:
extracting, by the computer, from the set of historical data, data values for the first performance metric for the plurality of entities corresponding to the selected timeframe;
generating, by the computer, a distribution of the values for the first performance metric for the plurality of entities corresponding to the selected timeframe;
restructuring, by the computer, the set of historical data by discretizing the distribution of values for the first performance metric within the set of historical data into a plurality of discrete values, wherein the computer automatically determines the discrete values based on a percentage of a calculated standard deviation;
iteratively scanning, by the computer, the restructured set of historical data to detect changes between at least two entities when: at a first date in a date range within the time frame, the at least two entities have a shared discrete value for the first performance metric, and at a later date in the date range within the time frame, one of the at least two entities has a discrete value of the first performance metric that diverges from the shared discrete value and the other of the at least two entities has a discrete value that remains at the discrete value of the first date;
iteratively determining, by the computer, a bias score for each of the at least two entities;
iteratively determining, by the computer, a second performance metric for each of the at least two entities, responsive to a determination that at least one entity diverges from the shared discrete value;
wherein the computer initially scans the selected historical data within the database based on an automatically selected data range that corresponds to the selected inputs and wherein with each iteration the computer dynamically adjusts the set of historical data by:
dynamically adjusting the data range based on a noise level associated with the second performance metric satisfying a noise threshold;
eliminating a particular entities from the set of historical data when a bias score for the particular entity satisfies a bias threshold,
eliminating any entity with a second performance metric that satisfies a predetermined threshold, and
re-scanning the set of historical data until at least one natural experiment is identified;
analyzing, by the computer, the business initiative based upon the at least one detected natural experiment;
presenting, by the computer, the analyzed business initiative for each entity from the at least two entities, and the bias score associated with each entity on the user interface of the computing device.

2. The method according to claim 1, wherein a first input limits the set of historical data to a time period.

3. The method according to claim 2, wherein the first input is selected from the group consisting of a price of a product or service, labor hours, media expenditures, geographic media use, a weather metric, a geographic limitation, a minimum experiment size, an entity list, a minimum number of test entities, a minimum number of control entities, a difference between the minimum number of test entities and a minimum number of control entities, a minimum experiment pre-period length, a minimum post-period length, an external market factor, a delay time period, and a number of time periods to aggregate.

4. The method according to claim 1, further comprising normalizing the set of historical data to compare values of different magnitudes.

5. The method according to claim 1, further comprising manipulating the set of historical data by assigning a weight to an input for each product or service in a category.

6. The method according to claim 5, further comprising varying the weight of each input based upon a change in the weight over a time period.

7. The method according to claim 1, wherein discretization further comprises automatically determining the plurality of ranges.

8. The method according to claim 1, wherein a first type of natural experiment occurs where an input for a test group and an input for a control group start at the same value; and at a certain time, the control group input remains at the same value and the test group input changes in value.

9. The method according to claim 1, wherein a second type of natural experiment occurs where a an input for a test group and an input for a control group start at the same value; and at a certain time, the test group and the control group each change in value but by different amounts.

10. The method according to claim 1, wherein a third type of natural experiment occurs where an input for a test group starts at a first value and an input for a control group starts at a different value; and at a certain time, the control group input remains at its value and the test group input changes in value.

11. The method according to claim 1, further comprising:
identifying a delay period where a value of an input is substantially transitioning from a first value to a second value; and
comparing the value before the delay period with the value after the delay period.

12. The method according to claim 1, wherein detecting the natural experiment further comprises transforming the set of historical data by aggregating the historical data.

13. The method according to claim 12, wherein the set of historical data is aggregated for each of a plurality of time periods.

14. The method according to claim 1, further comprising:
extending, by the computer, a length of the natural experiment for a time period after the detected natural experiment, wherein the extended range has an upper bound and a lower bound for a value of the input; and
receiving, by the computer, a selection whether to use the extended range.

15. The method according to claim 1, further comprising:
extending, by the computer, a length of the natural experiment for a time period before the detected natural experiment, wherein the extended range has an upper bound and a lower bound for a value of the input; and
receiving, by the computer, a selection whether to use the extended range.

16. The method according to claim 1, further comprising identifying, by the computer, when a detected natural experiment has a value of the input that corresponds to a change in a market factor.

17. The method according to claim 1, further comprising:
receiving, by the computer, a selection of at least one filter criteria; and
eliminating, by the computer, any detected experiments that do not meet the filter criteria.

18. The method according to claim 17, further comprising:
receiving, by the computer, a selection of an experiment; and
presenting, by the computer, a change in a value of an input for a test group based on the selected experiment.

19. The method according to claim 1, further comprising presenting, by the computer, a list of at least one natural experiment and changes in value of the at least one natural experiment.

20. A computer-implemented method for identifying a natural experiment to use in an analysis of a business initiative, the method comprising:
storing, by a computer, a set of historical data in a database regarding a plurality of entities in a business network, wherein the set of historical data includes values of attributes that relate to the business initiative;
receiving, by the computer from a first user interface of a user computing device rendered on a first webpage of a web browser displayed on the user computing device, a selection of inputs for the historical data, wherein the selection of inputs includes a timeframe and at least one measurable attribute;
extracting, by the computer, only the values of the inputs from the set of historical data in the database within the timeframe;
detecting, by the computer, at least one natural experiment by identifying changes in the set of historical data in the database between at least two entities by:
generating, by the computer, a distribution of the values for a first measurable attribute for the plurality of entities corresponding to the timeframe;
restructuring, by the computer, the set of historical data by discretizing the distribution of values for the first measurable attribute within the set of historical data into a plurality of discrete values, wherein the computer automatically determines the discrete values based on a percentage of a calculated standard deviation;
iteratively scanning, by the computer, the restructured set of historical data to detect at least one natural experiment by automatically generating a plot of the selected input versus the timeframe using the discretized historical data, wherein the plot identifies a first entity and a second entity have a shared discrete value on a first date and a shared discrete value on a second date, and wherein the first entity or the second entity is identified as a test entity;
iteratively determining, by the computer, a bias score for each of at least two entities;
iteratively determining, by the computer, a performance metric for each entity of the at least two entities, responsive to determining at least one entity diverges from the shared discrete value;
wherein the computer initially scans the selected historical data based on automatically selected range that corresponds to the selected input values from the historical data, and wherein with each iteration the computer dynamically adjusts the set of historical data by:
dynamically adjusting the plurality of ranges based on a noise level associated with the selected input values satisfying a noise threshold,
eliminating a particular entity from the set of historical data when a bias score for the particular entity satisfies a bias threshold,
eliminating any entity with a performance metric that satisfies a predetermined threshold, and
re-scanning the set of historical data until at least one natural experiment is identified;

analyzing, by the computer, the business initiative based upon at least one detected natural experiment; and presenting, by the computer, the analyzed business initiative on a second user interface rendered on a second webpage of the web browser of the user computing device, and wherein the second user interface displays an indicator associated with each analyzed business initiative, where the indicator comprises a color associated a range corresponding to the analyzed business initiative.

21. The method according to claim 20, further comprising identifying the natural experiment based upon an experiment type.

22. The method according to claim 21, wherein a first type of natural experiment occurs where an input for a test group and an input for a control group start at the same value; and at a certain time, the control group input remains at the same value and the test group input changes in value.

23. The method according to claim 21, wherein a second type of natural experiment occurs where a an input for a test group and an input for a control group start at the same value; and at a certain time, the test group and the control group each change in value but by different amounts.

24. The method according to claim 21, wherein a third type of natural experiment occurs where an input for a test group starts at a first value and an input for a control group starts at a different value; and at a certain time, the control group input remains at its value and the test group input changes in value.

25. The method according to claim 20, further comprising:

extending, by the computer, a length of at least one natural experiment for a time period before and/or after the detected natural experiment, wherein the extended range has an upper bound and a lower bound for a value of the input; and receiving, by the computer, a selection whether to use the extended range.

26. The method according to claim 20, further comprising:

identifying, by the computer, a delay period where a value of an input is substantially transitioning from a first value to a second value; and comparing, by the computer, the value before the delay period with the value after the delay period.

* * * * *